US008408339B2

(12) United States Patent
Makino

(10) Patent No.: US 8,408,339 B2
(45) Date of Patent: Apr. 2, 2013

(54) FRICTIONAL DRIVE DEVICE AND INVERTED PENDULUM TYPE VEHICLE USING THE SAME

(75) Inventor: Hiroyuki Makino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 12/902,377

(22) Filed: Oct. 12, 2010

(65) Prior Publication Data
US 2012/0086262 A1 Apr. 12, 2012

(51) Int. Cl.
*B62D 57/00* (2006.01)
(52) U.S. Cl. ............. 180/7.1; 180/20; 180/21; 301/5.23
(58) Field of Classification Search .................. 180/7.1, 180/10, 20, 21; 301/5.1, 5.23; 305/6, 7
See application file for complete search history.

(56) References Cited

U.S. PATENT DOCUMENTS

| | | | |
|---|---|---|---|
| 1,257,318 A * | 2/1918 | Coats | 29/894.34 |
| 3,260,324 A * | 7/1966 | Suarez | 180/10 |
| 4,076,263 A * | 2/1978 | Rand | 280/843 |
| 4,715,460 A * | 12/1987 | Smith | 180/7.1 |
| 5,164,795 A * | 11/1992 | Conway | 356/407 |
| 5,383,715 A * | 1/1995 | Homma et al. | 301/5.23 |
| 7,878,284 B1 * | 2/2011 | Shultz | 180/199 |
| 7,980,336 B2 * | 7/2011 | Takenaka et al. | 180/7.1 |
| 2003/0075366 A1 * | 4/2003 | Sabatie | 180/7.1 |
| 2006/0214497 A1 * | 9/2006 | Chen | 301/5.1 |
| 2008/0007108 A1 * | 1/2008 | Lamprich et al. | 301/5.23 |
| 2008/0018167 A1 * | 1/2008 | Fuji | 301/5.23 |
| 2010/0038960 A1 * | 2/2010 | Takenaka et al. | 305/133 |
| 2010/0096905 A1 | 4/2010 | Takenaka et al. | |
| 2010/0139996 A1 * | 6/2010 | Takenaka et al. | 180/20 |
| 2011/0067935 A1 * | 3/2011 | Gomi et al. | 180/21 |
| 2011/0067936 A1 * | 3/2011 | Takenaka et al. | 180/21 |

(Continued)

FOREIGN PATENT DOCUMENTS

| | | |
|---|---|---|
| WO | 2008/132779 A1 | 11/2008 |
| WO | 2008/139740 A1 | 11/2008 |

*Primary Examiner* — Paul N. Dickson
*Assistant Examiner* — Maurice Williams
(74) *Attorney, Agent, or Firm* — Carrier Blackman & Associates, P.C.; Joseph P. Carrier; William D. Blackman

(57) ABSTRACT

In a frictional drive device comprising a pair of drive disks each rotatably supported by a frame around a central axial line (A) in a mutually opposing relationship and configured to be individually rotatively actuated by a pair of actuators, a plurality of drive rollers arranged along an outer periphery of each drive disk so as to be rotatable along a prescribed plane of rotation, and an annular main wheel disposed at least approximately coaxially with respect to the central axial line and engaged by the drive rollers of the drive disks, the main wheel comprising an annular member and a plurality of driven rollers supported along the annular member so as to be rotatable around a tangential line of the annular member, each drive roller includes at least a pair of individually rotatable disk members coaxially disposed to each other and having different diameters, the diameters being selected so that the disk members engage the corresponding driven roller at outer peripheral parts thereof. Typically, each drive roller include a plurality of disk members coaxially stacked upon one another in a mutually freely rotatable manner so as to jointly define a substantially hourglass shaped outer profile. Thereby, the slippage in the frictional engagement between the drive rollers and driven rollers can be minimized so that the drive efficiency can be improved and the drive force capacity can be maximized.

4 Claims, 5 Drawing Sheets

U.S. PATENT DOCUMENTS

| | | |
|---|---|---|
| 2011/0067937 A1* | 3/2011 | Gomi et al. ............... 180/21 |
| 2011/0067939 A1* | 3/2011 | Takenaka ............... 180/21 |
| 2011/0067940 A1* | 3/2011 | Takenaka ............... 180/218 |
| 2011/0070997 A1* | 3/2011 | Gomi et al. ............... 476/66 |
| 2011/0070998 A1* | 3/2011 | Takenaka et al. ............... 476/68 |
| 2011/0071714 A1* | 3/2011 | Takenaka ............... 701/22 |
| 2011/0071752 A1* | 3/2011 | Takenaka et al. ............... 701/124 |
| 2011/0233989 A1* | 9/2011 | Takenaka et al. ............... 301/5.23 |
| 2012/0018232 A1* | 1/2012 | Uehara ............... 180/7.1 |
| 2012/0061156 A1* | 3/2012 | Takenaka et al. ............... 180/21 |

* cited by examiner

FRICTIONAL DRIVE DEVICE AND INVERTED PENDULUM TYPE VEHICLE USING THE SAME

TECHNICAL FIELD

The present invention relates to a frictional drive device and an inverted pendulum type vehicle using the same as a drive unit.

BACKGROUND OF THE INVENTION

Known is an inverted pendulum type vehicle or an omnidirectional vehicle incorporated with a frictional drive device which comprises a pair of drive assemblies individually actuated by electric motors and a main wheel held between the drive assemblies and frictionally driven by the drive assemblies. See WO2008/132779A1 (US20100096905A1) for instance. Each drive assembly comprises a drive disk coaxially opposing the drive disk of the other drive assembly and a plurality of drive rollers obliquely arranged along the circumference of the drive disk at a regular interval so as to be individually rotatable. The main wheel comprises a ring-shaped annular member rotatably supported by a frame around a central axial line thereof and a plurality of driven rollers arranged along the circumference of the annular member so as to be rotatable around the respective tangential lines. As the drive disks are turned by the electric motors, the driven rollers are frictionally driven by the drive rollers. When the drive rollers are turned around the tangential directions of the main wheel, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

In such a frictional drive device, the driven roller or driven rollers engaging the road surface or the object to be actuated are engaged by at least one of the right drive rollers and at least one of the left drive rollers so that the traction force or drive force can be obtained at all times. In this regard, it is highly important that the slippage between the drive rollers and driven rollers to be minimized in achieving a high efficiency of the frictional drive device and increasing the traction or drive force which the frictional drive device is capable of delivering.

BRIEF SUMMARY OF THE INVENTION

Based on such a recognition by the inventor, a primary object of the present invention is to provide a frictional drive device that can minimize slippage between drive rollers and driven rollers.

A second object of the present invention is to provide a frictional drive device that can maintain a high drive efficiency under all drive conditions.

A third object of the present invention is to provide a frictional drive device that can deliver a maximum drive force for the given configuration.

A fourth object of the present invention is to provided an inverted pendulum type vehicle using a frictional drive device that can minimize slippage between drive rollers and driven rollers of a frictional drive device incorporated therein as a drive unit.

According to the present invention, such objects can be accomplished by providing a frictional drive device, comprising a frame; a pair of drive disks each rotatably supported by the frame around a central axial line in a mutually opposing relationship; a pair of first actuators supported by the frame for individually rotatively actuating the drive disks; a plurality of drive rollers arranged along an outer periphery of each drive disk so as to be rotatable along a prescribed plane of rotation at a certain angular relationship with the central axial line; and an annular main wheel disposed at least approximately coaxially with respect to the central axial line and engaged by the drive rollers of the drive disks, the main wheel comprising an annular member and a plurality of driven rollers supported along the annular member so as to be rotatable around a tangential line of the annular member; wherein each drive roller includes at least a pair of individually rotatable disk members coaxially disposed to each other and having different diameters, the diameters being selected so that the disk members engage the corresponding driven roller at outer peripheral parts thereof.

When both the drive rollers and driven rollers are formed as simple cylindrical members, each drive roller engages the corresponding driven roller at a point if the surfaces of the two members do not deform. In reality, at least one of the drive roller and driven roller undergoes a significant elastic deformation, and the two rollers engage each other over a contact area of a certain size. However, the size of the contact surface area is limited, and, inevitably, there is a significant amount of slippage in the contact surface owing to the uneven relative speeds between the two contacting parts, and this causes the drive efficiency and drive capacity to be impaired. However, by forming each drive roller with at least a pair of disk members having different outer diameters and dimensioned so as to engage the driven roller at the peripheral parts thereof, a large contact surface area can be achieved by using a suitable number of disk members and selecting a suitable thickness for each disk member while accommodating the unevenness in the relative speed between the two parts by permitting relative rotation between the different disk members.

To optimize this advantage, each drive roller may include a plurality of disk members coaxially stacked upon one another in a mutually freely rotatable manner so as to jointly define a substantially hourglass shaped outer profile. In such a case, each disk member may be given with a tapered outer peripheral surface so that the disk members jointly define a substantially smooth hourglass shaped outer contour or an axially straight outer peripheral surface so that the disk members jointly define an hourglass shaped outer contour in an axially stepwise fashion. In the latter case, the frictional coefficient between the drive roller and driven roller may be made greater.

At any event, the outer profile of each drive roller should be configured so as to engage the corresponding driven roller along a line of contact extending a prescribed axial length of the drive roller. This axial length is desired to be maximized for best results, and may extend substantially over the entire axial length of the drive roller.

It was found that an outer circumferential surface of each drive roller should be substantially harder than an outer circumferential surface of the corresponding driven roller for optimum results. For this purpose and/or for increasing the frictional force (in relation with the object to be actuated and/or drive roller), an outer circumferential surface of each driven roller may be covered by elastomeric material or at least a large part of each driven roller may be made of elastomeric material.

It was found that an outer circumferential surface of each drive roller should be substantially harder than an outer circumferential surface of the corresponding driven roller for optimum results. For this purpose and/o for increasing the frictional force (in relation with the object to be actuated and/drive roller), an outer circumferential surface of each driven roller may be covered by elastomeric material or at least a large part of each driven roller may be made of elastomeric material.

This frictional drive device can be advantageously applied to a drive unit for an inverted pendulum type vehicle.

BRIEF DESCRIPTION OF THE DRAWINGS

Now the present invention is described in the following with reference to the appended drawings, in which.

DETAILED DESCRIPTION OF THE PREFERRED EMBODIMENTS

The frictional drive device according to the present invention and the vehicle incorporated with the frictional drive device is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one of each of such pairs may be described in the following by denoting the component with a numeral without a suffix, instead of repeating the same description with respect to the other of the pair. These numerals may also be used without the suffix in the following description to denote such components collectively.

Figure 1:
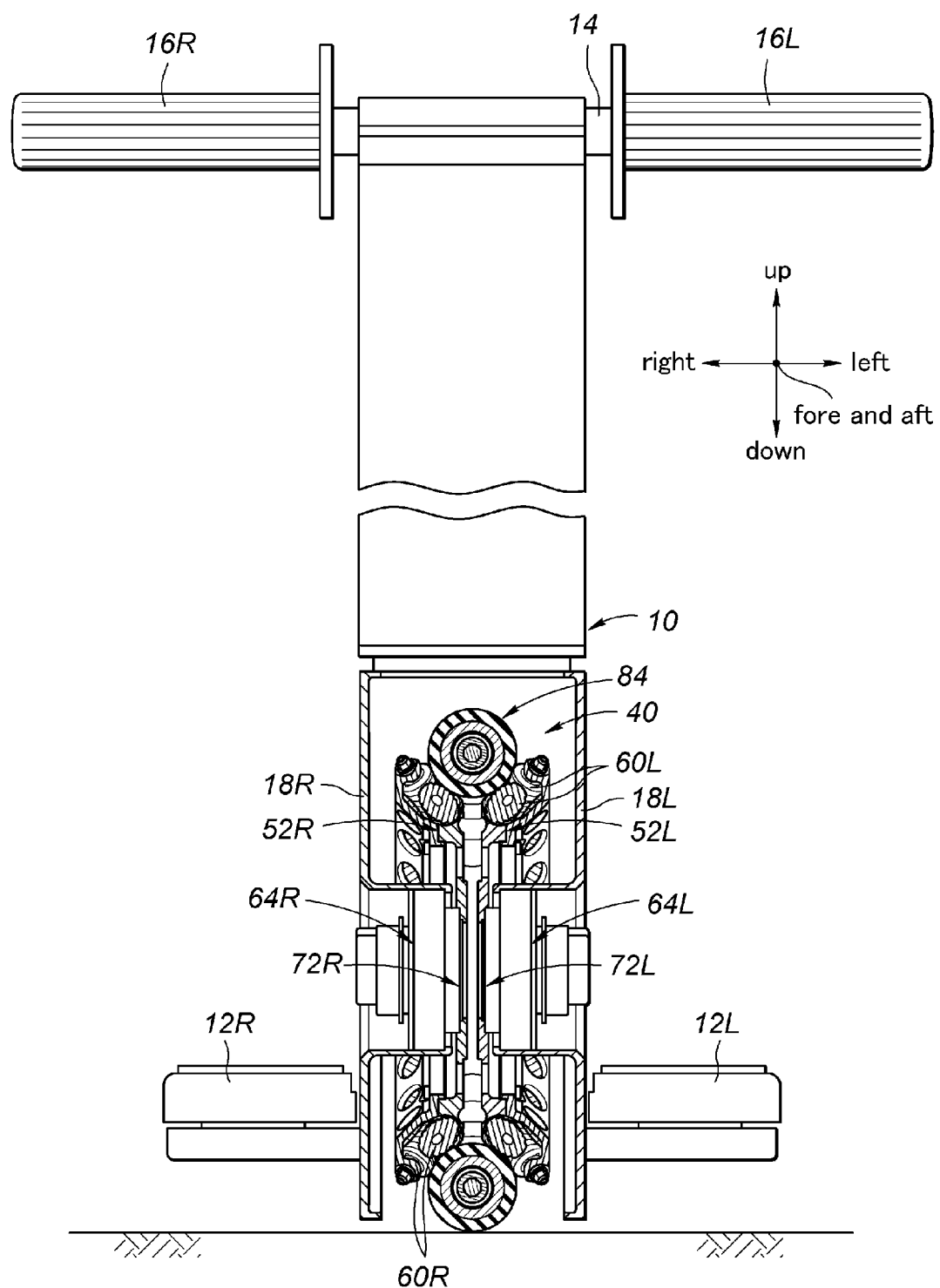
FIG. 1 is a sectional front view of an inverted pendulum type vehicle incorporated with a frictional drive device according to the present invention for a drive unit thereof.

Referring to FIG. 1, an inverted pendulum type vehicle embodying the present invention comprises a columnar frame 10 having a drive unit 40 incorporated in a lower part thereof. A lower part of the frame 10 is provided with a pair of steps 12 extending from either side thereof, and an upper end of the frame 10 is provided with a handle bar 14 extending laterally from either direction. Each lateral end of the handle bar 14 is provided with a grip 16.

The drive unit 40 is configured as a unicycle drive unit, and is interposed between a pair of side walls 18 of a lower part of the frame 10. A control unit not shown in the drawings controls the operation of the drive unit 40 according to the output signals of a gyro sensor and a load sensor (not shown in the drawings) so that the frame 10 is maintained in an upright posture as an inverted pendulum type vehicle in operation and is enabled to travel in both a fore and aft and lateral direction.

Figure 2:
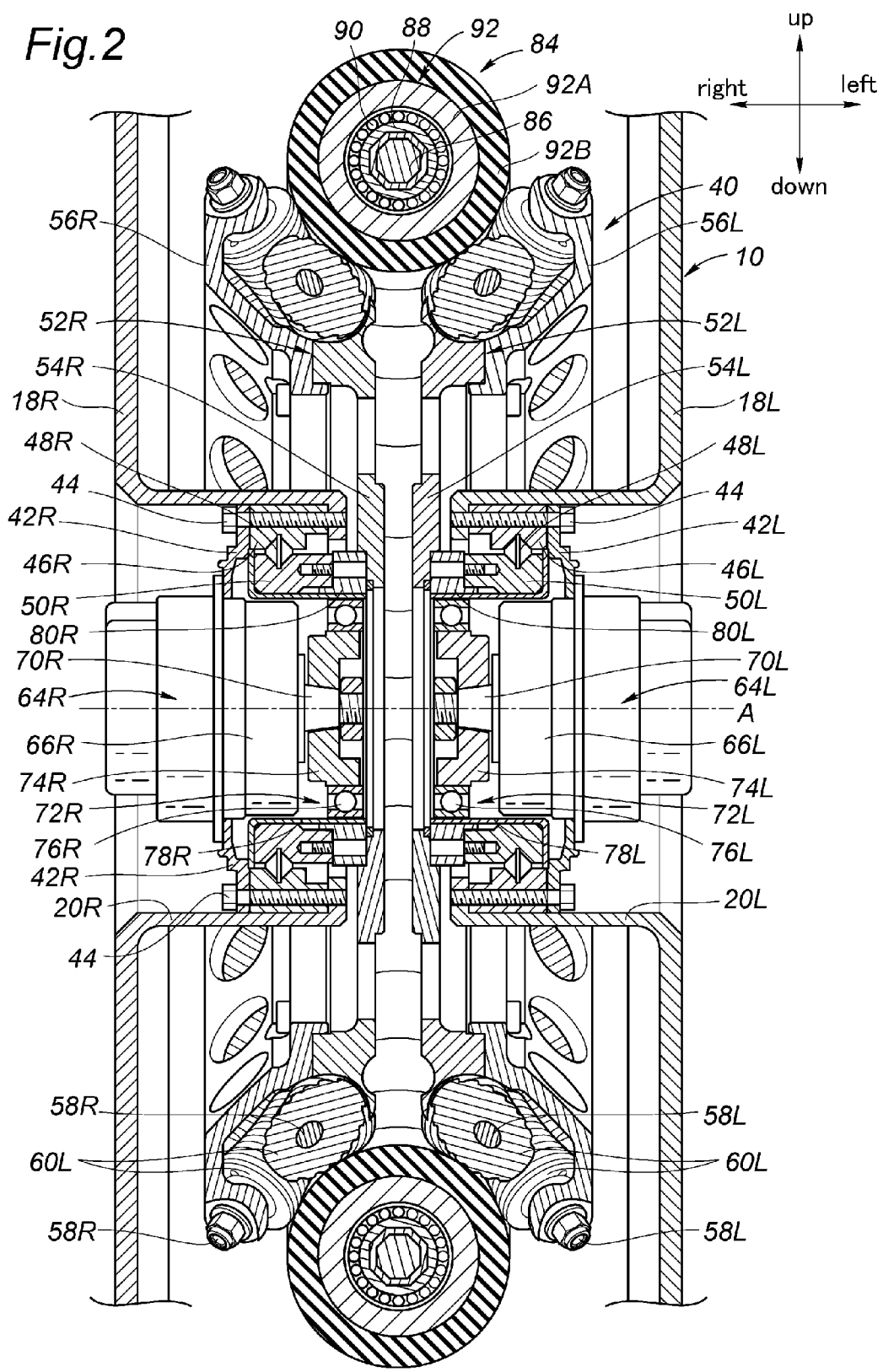
FIG. 2 is an enlarged sectional front view of the frictional drive device.
Figure 3:
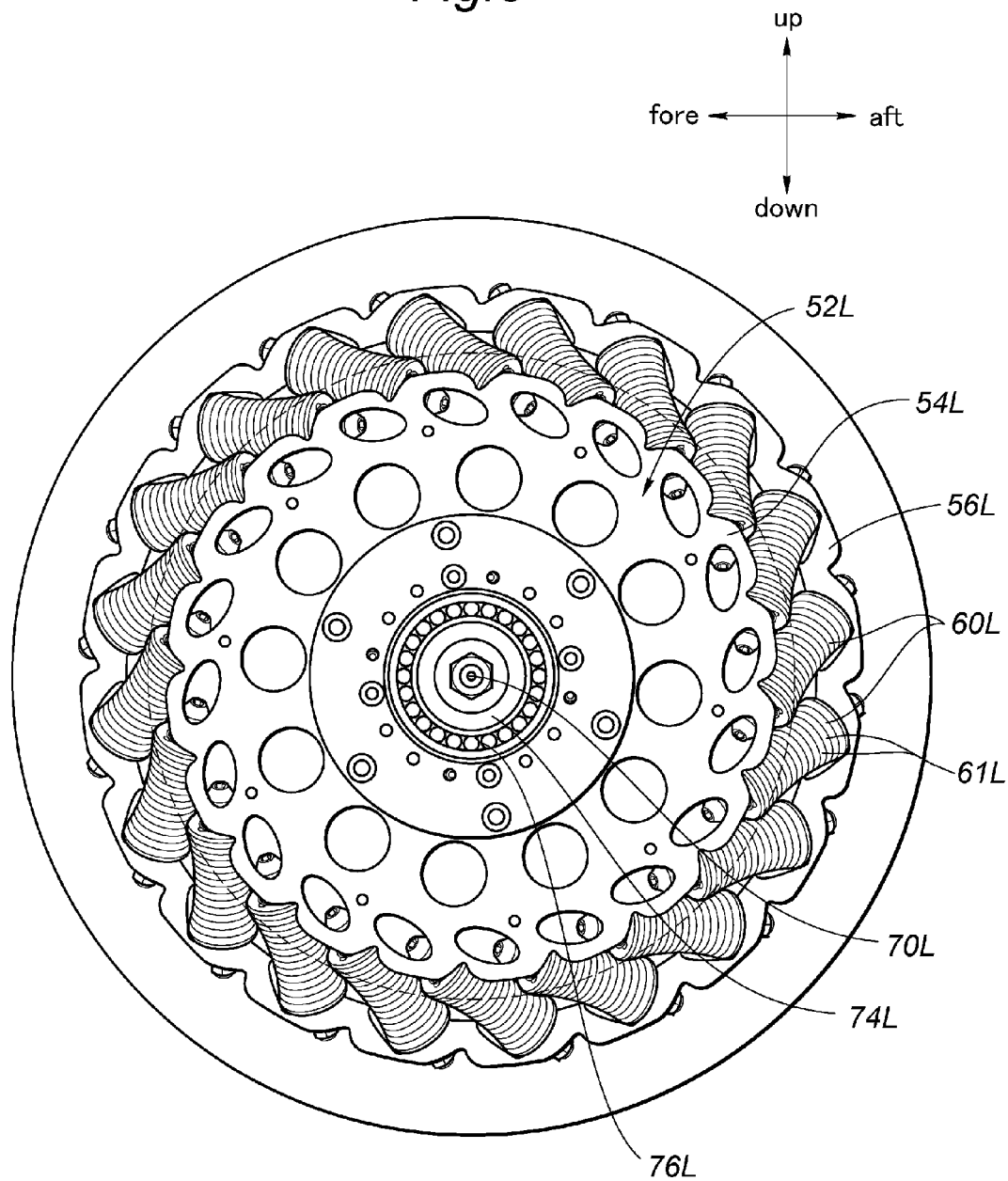
FIG. 3 is a front view of a drive assembly of the frictional drive device.

FIGS. 2 and 3 show the details of the drive unit 40. A tubular extension 20 extends inwardly from the inner surface of each side wall 18. The free end or inner end of the tubular extension 20 is formed with an internal radial flange. Each tubular extension 20 supports a drive assembly 52 which is substantially a mirror image of the drive assembly 52 supported by the other tubular extension 20.

In each of these drive assemblies 52, an annular mount member 46 is received closely in the inner circumferential surface of the tubular extension 20, and is axially interposed between the internal radial flange and a ring member 42 by using threaded bolts 44 passed through openings formed in the ring member 42 and annular member 46 and threaded into threaded openings formed in the internal radial flange. The annular mount member 46 and ring member 42 are thus coaxially disposed with respect to the tubular extension 20.

The mount member 46 is configured also as an outer race for a crossed roller bearing 48. The crossed roller bearing 48 supports both the radial load and axial (thrust) load acting between the mount member 46 and an inner race 50 disposed coaxially within the mount member 46. The inner race 50 is fixedly attached to an output end of a wave gear device 72 which is also coaxially disposed with respect to the mount member 46 as will be described hereinafter. The wave gear device 72 may be of a per se known type.

The drive assembly 52 further comprises a drive disk 54 directly and fixedly connected to the output end of the wave gear device 72, and an outer peripheral part of the drive disk 54 is formed as a frusto-conical outer peripheral part 56 in a coaxial fashion. Each drive disk 54 has an axial center line A which is coaxial with the tubular extension 20.

A plurality of drive rollers 60 are arranged along the outer periphery of the outer peripheral part 56 at a regular circumferential interval concentrically around the axial center line A of the drive disk 54. Each drive roller 60 is supported by the outer peripheral part 56 via a roller shaft 58 extending perpendicularly to a plane which is neither parallel nor perpendicular to the axial center line of the drive disk 54. Thus, the drive rollers 60 have planes of rotation which are neither parallel or perpendicular to the central axial line A of the drive disks 54.

In other words, the two sets of roller shafts 58 supported by the two outer peripheral parts 56 are symmetric to (mirror images of) each other, and extend in a skewed relationship to the central axial line A. Thus, the drive rollers 60 supported by the roller shafts 58 are arranged on the outer peripheral part 56 similarly as the teeth of a conical helical gear.

As can be appreciated by a person skilled in the art, the drive disk 54 may be freely configured as long as the plurality of drive rollers 60 may be supported along a circle concentric to the central axial line A in a rotation symmetric manner and each has a rotational center line extending in a prescribed direction.

An electric motor 64 is disposed coaxially inside the inner race 50, and comprises an outer housing 66 internally provided with stator coils (not shown in the drawings). The outer housing 66 is fixedly attached to the mount member 46 via the ring member 42. A rotor shaft 70 extends out of an inner end of the outer housing 66.

The free end of the rotor shaft 70 is connected to a rigid wave plug 74 or an input member of the corresponding wave gear device 72. The wave gear device 72 is disposed coaxially with respect to the axial center line A, and includes, in addition to the wave plug 74 having an elliptic profile, a wave bearing 76 fitted on the wave plug 74, a flexible external gear member 78 consisting of a flanged cylindrical thin-shell member frictionally engaging the outer circumferential surface of the wave bearing 76, and a rigid internal gear member 80 having internal gear teeth meshing with external gear teeth of the external gear member 78. The internal gear member 80 serves as the output end of the wave gear device 72, and is connected to the drive disk 54 by using threaded bolts.

The rotational output of each electric motor 64 is thus reduced in speed by the wave gear device 72, and individually transmitted to the corresponding drive disk 54.

The two sets of concentrically arranged drive rollers 60 interpose a main wheel 84 from two lateral sides thereof so as to hold the main wheel 84 coaxially with the central axial line A. In other words, the main wheel 84 is rotatably supported by the two drive assemblies 52 is a coaxial relationship without any rotary shaft supporting the main wheel 84.

The main wheels 84 comprises an annular member 86 having a polygonal cross section, a plurality of inner sleeves 88 fixedly fitted on the annular member 86 along the circumferential length thereof and a plurality of driven rollers 92 each rotatably supported by the corresponding inner sleeve 88. Thus, each driven roller 92 is enabled to freely rotate around a tangential line of the annular member 86.

Each driven roller 92, which is configured to be engaged by the drive rollers 60, and to engage the road surface or the object to be actuated, includes a metallic sleeve 92A rotatably fitted on the corresponding inner sleeve 88 and a relatively soft sleeve 92B made of rubber or other elastomeric material vulcanized or otherwise affixed to the outer circumferential surface of the metallic sleeve 92A. The rotation of each drive disk 54 can be transmitted to the main wheel 84 via the frictional engagement between the drive rollers 60 and driven rollers 92.

The numbers of the drive rollers 60 and driven rollers 92 and sizes of the individual drive rollers 60 and driven rollers 92 are determined such that the driven roller (or driven rollers) 92 engaging the road surface or the object to be actuated in the lower most part of the main wheel 84 is engaged by at least one of the drive rollers 60 of the right drive disk 54R and one of the drive rollers 60 of the left drive disk 54L at all times. Thereby, at least the driven roller 92 engaging the road surface is given with a traction force by the relevant drive rollers 60.

The plane of rotation of each drive roller 60 is tilted with respect to the plane of rotation of the main wheel 84, and is neither parallel nor perpendicular to the central axial line A of the drive disks 54. The rotational center line of each drive roller 60 is also in a skewed relationship to the central axial line A of the drive disks 54. In other words, each drive roller 60 has a rotational central line which is tilted with respect to the central axial line A of the drive disks 54 in a skewed relationship, and the plane of rotation of each drive roller 60 is neither perpendicular nor parallel to the central axial line A.

More specifically, the rotational center line of each drive roller 60 is tilted with respect to the corresponding radial line of the annular member 86 (defining a rotational center line of each driven roller 92), and, additionally, is three dimensionally tilted with respect to a line tangential to the circular center line of the annular member 86. The arrangement of the drive rollers 60 in the drive assemblies 52 is similar to the arrangement of the teeth in a conical spiral gear. For more detailed discussion on this matter, reference should be made to the International Patent Laid Open Publication WO2008/139740.

The rotational speed of each driven roller 92 is determined by the difference in the speed between the right and left drive disks 54. For instance, when the two drive disks 54 are turned at the same speed in mutually opposite directions, the main wheel 84 does not rotate, but the driven rollers 92 rotate. Thereby, the driven rollers 92 produce a lateral drive force, and the main wheel 84 propels the vehicle in the lateral direction. When the two drive disks 54 are turned at the same speed in a same direction, the main wheel 84 rotates around the central axial line A, but the driven rollers 92 do not rotate. Thereby, the driven rollers 92 produce a fore and aft drive force, and the main wheel 84 propels the vehicle in the fore and aft direction.

By thus individually controlling the rotational speeds and rotational directions of the two drive disks 54 by using the corresponding electric motors 64, the inverted pendulum type vehicle is enabled to travel in any desired direction.

Figure 4:
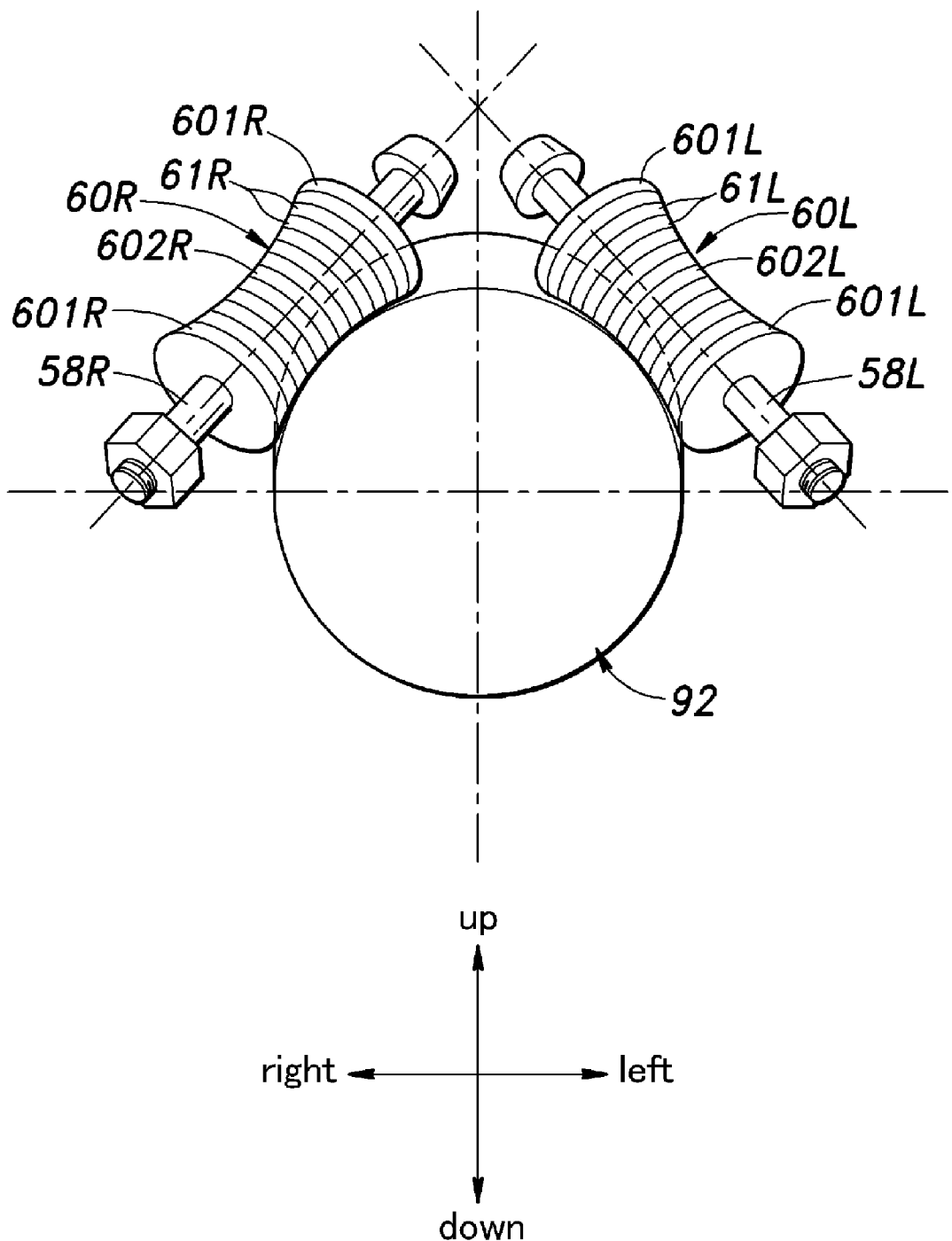
FIG. 4 is a front view of a pair of drive rollers engaging a main wheel.
Figure 5:
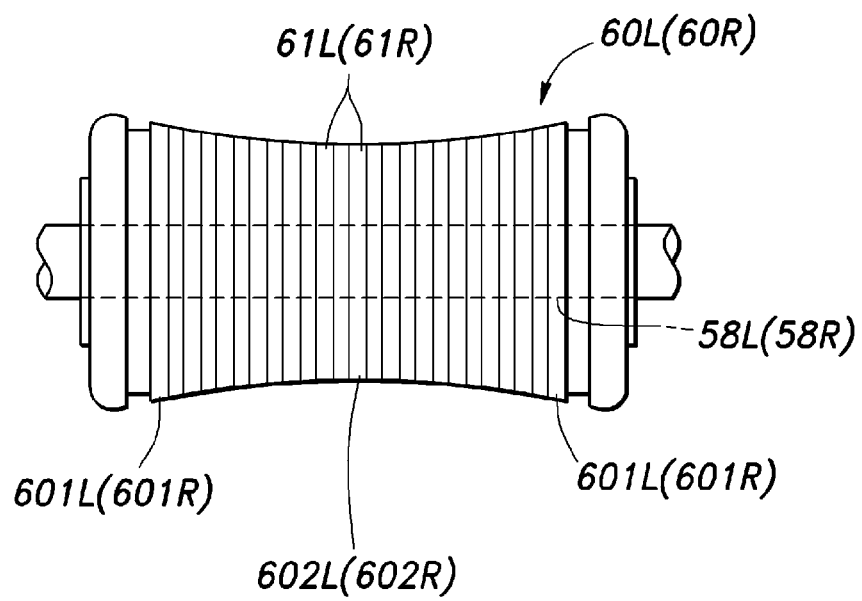
FIG. 5 is an enlarged front view of a drive roller.

FIGS. 4 and 5 show the details of the drive rollers 60. Each drive roller 60 comprises a plurality of disk members 61 coaxially supported by the roller shaft 58 so as to be individually rotatable. Each disk member may be made of any suitable material, such as metallic material and plastic material, which is preferably harder than the surface material of the driven rollers 92. Those disk members 602 located centrally on the roller shaft 58 are smaller in diameter than those 601 on either axial end of the roller shaft 58 so that the disk members 61 jointly define an hourglass shaped profile. Preferably, the diameters of the disk members 61 are progressively and gradually diminished from the outermost one to the central one. As can be appreciated from FIG. 4, the rotational center line of each drive roller 60 is in a skewed relationship to the rotational center line (or tangential line of the annular member 86) of the corresponding driven roller 92. The axially central location of the roller shaft 58 may be considered as the point of least distance between the two rotational center lines.

An important point is that the individual disk members 61 engage the corresponding driven roller 92 at outer peripheral parts of the disk members 61, and this requires that each disk member 61 is given with a radius corresponding to the distance between the rotational center line of the drive roller 60 and the opposing surface of the driven roller 92. Therefore, the outer profile of each drive roller 60 may be defined such that the drive roller 60 and corresponding driven roller 92 engage each other at a line extending over a prescribed axial length of the drive roller 60 assuming that each roller does not undergo any elastic or plastic deformation. In the case where the driven roller 92 is given with a simple cylindrical profile, the contact between the drive roller 60 and driven roller 92 would occur at a point supposing that there is no elastic or plastic deformation of the two rollers 60 and 92. This axial length is desired to be as long as possible, and is preferably as long as the axial length of the effective part of the driven roller 92.

In the illustrated embodiment, a relatively large number of disk members 61 are used for each drive roller 60. However, according to a broad concept of the present invention, each drive roller 60 may include at least a pair of individually rotatable disk members 61 coaxially disposed to each other and having different diameters, the diameters being selected so that the disk members 61 engage the corresponding driven roller 92 at outer peripheral parts thereof.

At any event, as compared to the case where the driven roller 92 is given with a simple cylindrical profile, the drive roller 60 of the illustrated embodiment can engage the surface of the driven roller 92 over a substantially larger surface contact area for the given capability of each roller for an elastic deformation. The large surface contact area results in an improved drive efficiency owing to a reduced slippage, and an increase in the capacity for the transmission of force (a larger traction force can be transmitted).

As shown in FIG. 5, the outer profile of the drive roller 60 may be defined by plurality of disk members 61 each having a tapered outer peripheral surface such that the outer periphery surfaces of the disk members 61 jointly define a smooth hourglass shaped profile for the drive roller 60. It should be noted that a part of the disk members 61 may have a simple straight cylindrical outer peripheral surface for the purpose of the disk members 61 jointly defining a smooth hourglass shaped profile without departing from the spirit of the present invention.

Figure 6:
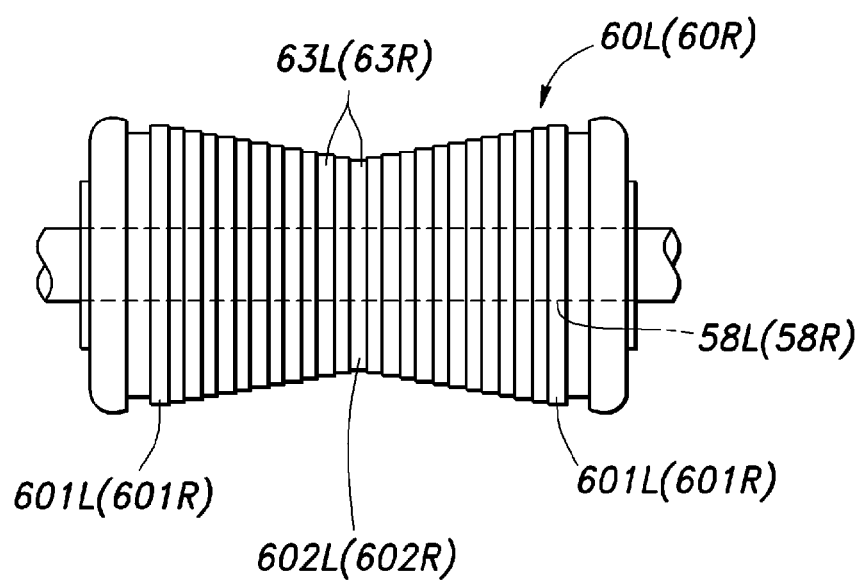
FIG. 6 is a view similar to FIG. 5 showing a second embodiment of the present invention.

Alternatively, as shown in FIG. 6, the disk members 63 may be each provided with a simple straight cylindrical outer peripheral surface such that the outer periphery surfaces of the disk members 63 jointly define an hourglass shaped profile for the drive roller 60 in an axially stepwise manner. In this case, the protruding edges or corners of the disk members 63 defining an irregular profile of the drive roller 60 increase the effective frictional coefficient between the drive roller 60 and driven roller 92. In FIG. 6, the parts corresponding to those of the embodiment illustrated in FIG. 5 are denoted with like numerals without repeating the description of such parts.

According to yet another embodiment of the present invention, each disk member 63 is formed with an annular groove or a plurality of grooves so that the effective frictional coefficient between the drive roller 60 and driven roller 92 may be even further increased.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A frictional drive device, comprising a frame; a pair of drive disks each rotatably supported by the frame around a central axial line in a mutually opposing relationship; a pair of actuators supported by the frame for individually rotatively actuating the drive disks; a plurality of drive rollers arranged along an outer periphery of each drive disk so as to be rotatable along a prescribed plane of rotation at a certain angular relationship with the central axial line; and an annular main wheel disposed at least approximately coaxially with respect to the central axial line and engaged by the drive rollers of the drive disks, the main wheel comprising an annular member and a plurality of driven rollers supported along the annular member so as to be rotatable around a tangential line of the annular member; wherein each drive roller includes at least a pair of individually rotatable disk members coaxially stacked upon one another in a mutually freely rotatable manner and having different diameters so as to jointly define a substantially hourglass shaped outer profile, the diameters being selected so that the disk members engage the corresponding driven roller at outer peripheral parts thereof, and wherein each disk member is given with an axially straight outer peripheral surface so that the disk members jointly define an hourglass shaped outer contour in an axially stepwise fashion.

2. The frictional drive device according to claim 1, wherein an outer circumferential surface of each drive roller is substantially harder than an outer circumferential surface of the corresponding driven roller.

3. The frictional drive device according to claim 2, wherein an outer circumferential surface of each driven roller is covered by elastomeric material.

4. An inverted pendulum vehicle incorporated with the frictional drive device according to claim 1 as a drive unit.

* * * * *